Jan. 29, 1924.

L. D. J. A. DUNOYER 1,482,222

WEIGHING AND MEASURING APPARATUS

Filed Sept. 2, 1921  4 Sheets-Sheet 1

Inventor
Louis D. J. A. Dunoyer
by Richards Geier
Attorneys

Jan. 29, 1924. 1,482,222
L. D. J. A. DUNOYER
WEIGHING AND MEASURING APPARATUS
Filed Sept. 2, 1921 4 Sheets-Sheet 2

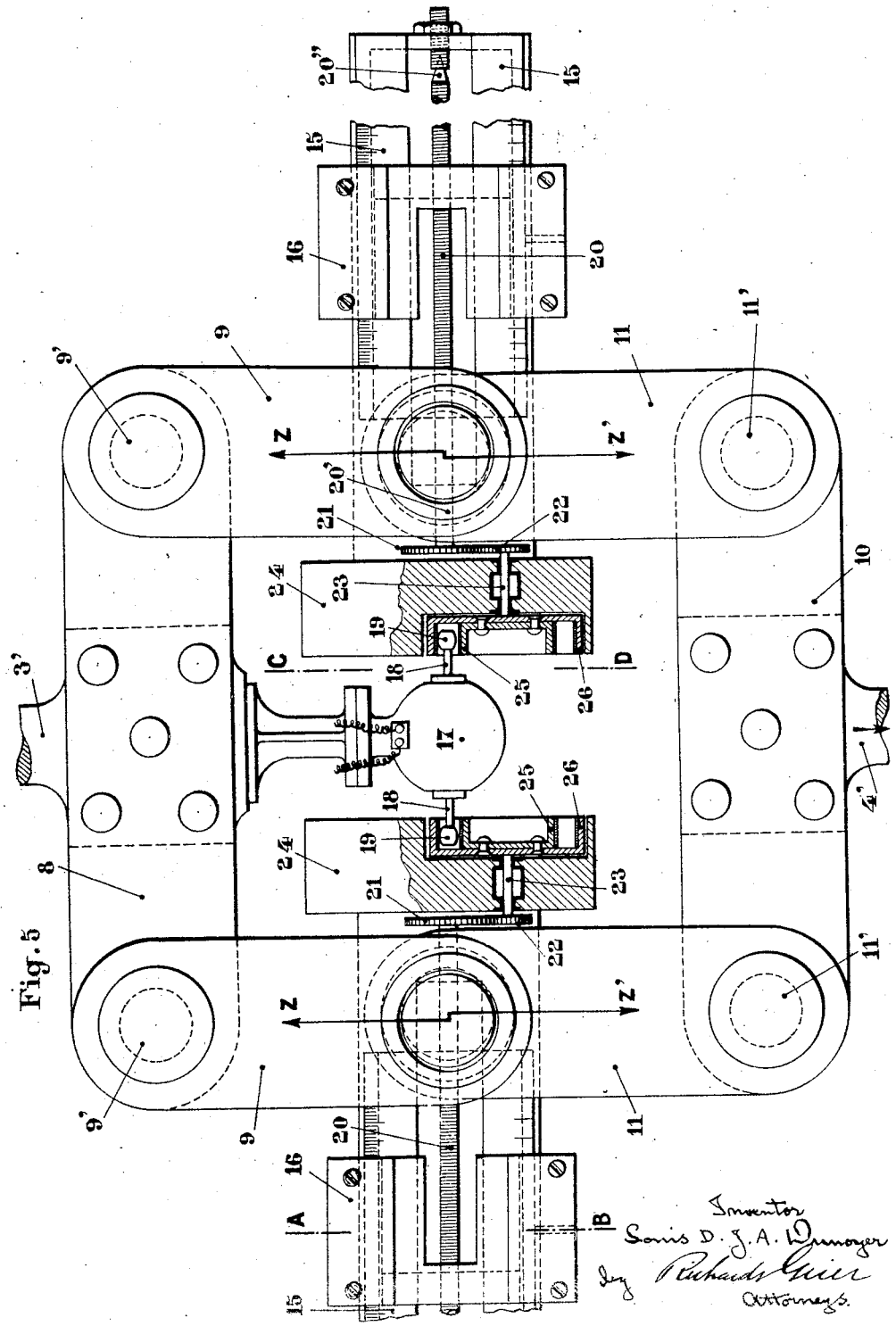

Jan. 29, 1924.  1,482,222
L. D. J. A. DUNOYER
WEIGHING AND MEASURING APPARATUS
Filed Sept. 2, 1921   4 Sheets-Sheet 4

Patented Jan. 29, 1924.

1,482,222

UNITED STATES PATENT OFFICE.

LOUIS DOMINIQUE JOSEPH ARMAND DUNOYER, OF NEUILLY-SUR-SEINE, FRANCE, ASSIGNOR TO SOCIÉTÉ ANONYME DES FORGES ET ATELIERS DE LA FOURNAISE, OF ST.-DENIS, SEINE, FRANCE.

WEIGHING AND MEASURING APPARATUS.

Application filed September 2, 1921. Serial No. 498,066.

*To all whom it may concern:*

Be it known that I, LOUIS DOMINIQUE JOSEPH ARMAND DUNOYER, a citizen of the French Republic, residing at No. 48 Avenue de Neuilly, Neuilly-sur-Seine, France, have invented certain new and useful Improvements in and Relating to Weighing and Measuring Apparatus (for which I have applied for patent in France, August 4, 1920), of which the following is a specification.

This invention relates to a weighing apparatus which is particularly constructed with the object of being attached to a travelling crane or similar apparatus in order to obtain the weighing of a piece whilst it is carried over by the crane.

The principle of the invention, however, is not exclusively applicable to a type of apparatus intended to be attached to a lifting apparatus but may be utilized for the construction of other apparatus or instruments intended to measure a weight or the size of an effort.

One form of construction of the invention is described hereinafter for an apparatus intended to be attached to a travelling or ordinary crane or to similar apparatus.

Figure 1:
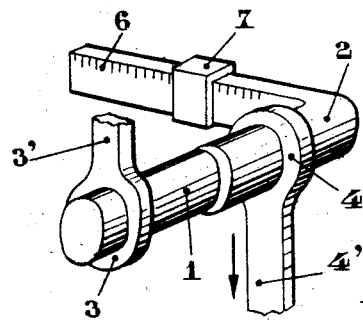
Figure 2:
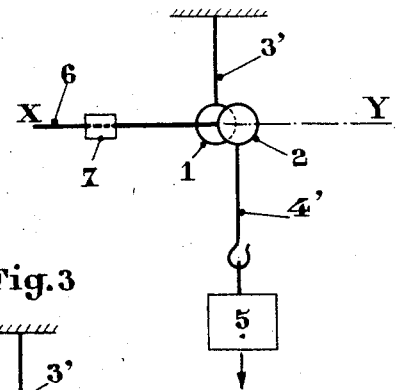
Figure 3:
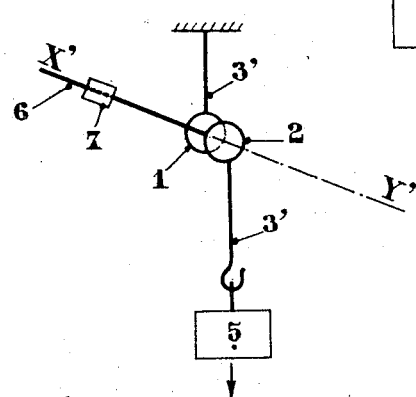
Figure 4:
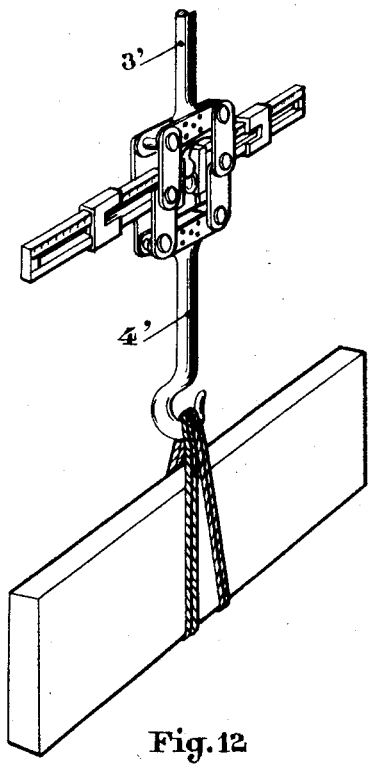

The description is made with reference to the accompanying drawings, in which:

Fig. 1 illustrates in perspective the apparatus in an elementary diagrammatical form, Figs. 2 and 3 show by a diagrammatical drawing the principle of the mode of action of the apparatus, Fig. 4 illustrates in perspective a mode of practical construction of the apparatus of a symmetrical double type.

Figure 9:
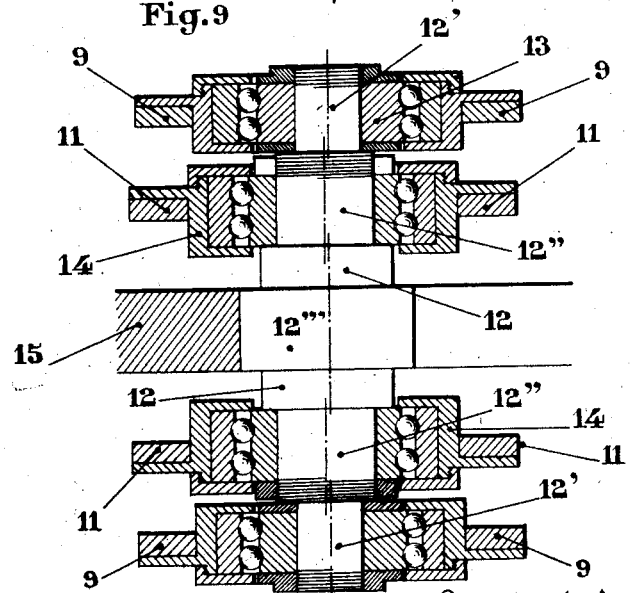
Figure 6:
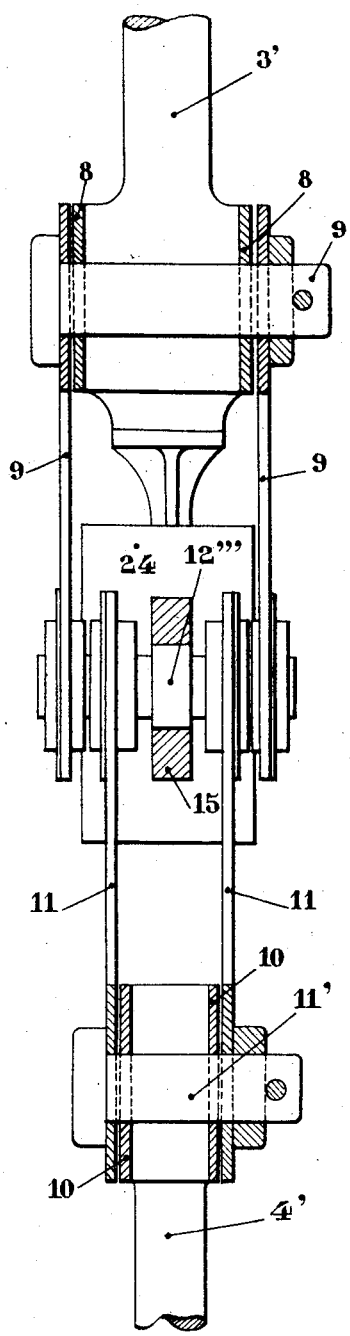
Figure 12:
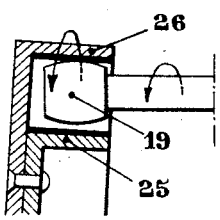
Figure 13:
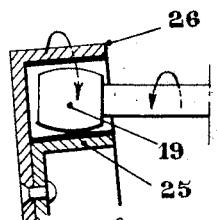
Figure 7:
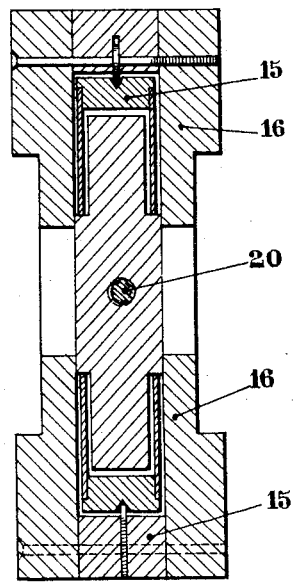
Figure 10:
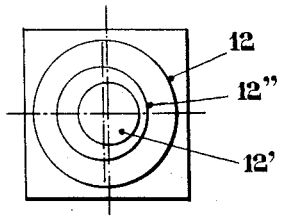
Figure 8:
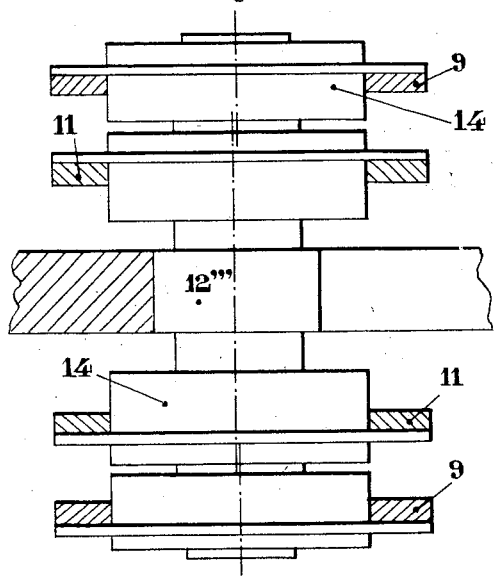
Figure 11:
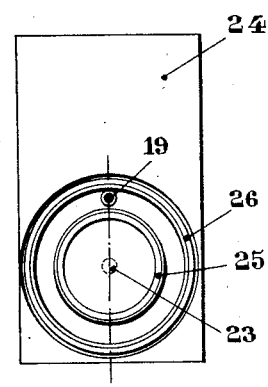

Fig. 5 illustrates on an enlarged scale the apparatus being viewed from the front, and certain parts being in section, Fig. 6 is a view perpendicular to the previous one in transverse section and side view along two sections passing by the axis of suspension and by one of the double eccentric axes, Fig. 7 is a section on a large scale along A—B of Fig. 5, Fig. 8 is a partial view in plan also on a large scale showing the attachment of suspension forks to the double eccentric axes, Fig. 9 is a similar view to that of Fig. 8, partly in section showing the arrangement of attachment of the forks on eccentric double axes, through the intermediary of ball bearings, Fig. 10 shows the member forming the eccentric double axis viewed from the end, Fig. 11 is a view along C—D of Fig. 5 showing the arrangement for an automatic operation of a cursor by means of a friction roller situated in the annular space of two concentric drums which are in mechanical connection with the cursor, the said roller being rotated by means of an electric motor, and Figs. 12 and 13 show how the motive roller is placed into contact with one or the other of the said two concentric drums in order to rotate them and therefore to determine the displacement of the cursor in one or the other direction.

The principle of the apparatus is as follows:—

Let us consider (see Figs. 1, 2 and 3) a member consisting of two axes 1 and 2 integral with each other, arranged end to end and excentred relatively to each other, the said member being arranged in such a manner that the diameter X—Y of eccentricity shall be approximately horizontal.

Let us assume that through the intermediary of suitable members such as two collars 3 and 4 engaged upon the eccentric axes 1 and 2 the device shall be on one side suspended at a fixed point by means of a rod 3' integral with an arm 3 and on the other end it shall act as a suspension by means of a rod 4' integral with the collar 4, to the body 5 to be weighed.

Lastly, let us assume that the device formed by the two eccentric axes, 1 and 2 shall be also integral with a bar or lever 6 which represents the said axis of eccentricity X—Y and which is provided with a sliding weight 7 as in the weighing apparatus called a roman balance.

It is seen that when a load 5 is exerted on the rod 4' the arrangement of the two eccentric axes 1 and 2 has a tendency to take a position such that the axis of eccentricity X—Y which in the state of rest, occupies a horizontal position, takes then an inclined position X'—Y' (Fig. 3).

It is therefore seen that in order to bring the said axis into a horizontal position X—Y it is sufficient to displace through a suitable amount the sliding weight 7 along the lever 6 which is the practical realization of the said axis, the position of the said cursor 7 upon the lever 6 measuring thus the size of the load 5.

The apparatus which is illustrated by the other figures of the drawing in a practical mode of construction is more particularly designed so as to be adapted to a travelling crane with a view to allowing the weighing of the pieces which are operated by the crane.

The apparatus is, moreover, provided with an arrangement by which the displacement of the cursors is automatically operated by an electric motor.

The apparatus in the said form of construction is double and comprises symmetrically two double eccentric axes, two levers and two cursors, this in order to have an improved form of mechanical construction of the instrument, the principle of the arrangement remaining the same.

The bar by means of which the apparatus is suspended to the fixed point represented by the travelling crane is indicated at 3' and the bar to which the load is suspended is indicated by 4'.

A transverse member 8 is secured to the bar 3' the ends of the said member by means of articulation axes 9' double arms 9 being secured thereto and in the same manner the bar 4' is integral with a transverse member 10 to which double arms 11 are secured by means of articulation axes 11'.

The whole of the bar 3' and transverse member 8 and of the double arms 9 have thus the general shape of a fork the two arms of which are linked; the same thing happens with the bar 4' with its transverse member 10 and double arms 11. The two forks 3'—8—9—9 on one side and 4'—10—11—11 on the other side are interconnected by means of two eccentric double axes, the arms 9—9 being engaged on one of the bearings of the said double axes and the arms 10—10 being engaged on the other bearing in such a manner as to produce the diagrammatical arrangement indicated by the Figs. 1, 2 and 3.

Fig. 5 shows the moments Z Z' which are exerted upon the eccentric axes according to the principle of the invention; no reference numerals have been given to the eccentric axes which are seen from the end.

It will be seen that the two bearings of the double axes are only excentred relatively to each other of a very small quantity in view of the importance of the load to be measured in the type of apparatus considered.

The arms 9 and 11 engage respectively on the eccentric bearings 12', 12'' of the axis 12 through the intermediary of ball bearings 13, the inner rings of the said ball bearings being adjusted upon the eccentric bearings and the outer rings being adjusted in boxes 14 integral with the suspension arms 9 and 11 (Figs. 8 and 9).

The double eccentric axis is rendered integral by its middle part 12''' with a member 15 which is continued by two parallel rulers forming the lever and which correspond to the member 6 of Figs. 1, 2 and 3.

The two double eccentric axes correspond to two balance levers 15 and two cursors 16 are mounted upon the latter.

The balance levers 15 with their cursors 16 may be constructed according to the construction shown in section in Fig. 7. This construction may, in fact, vary.

The balance levers are graduated in a similar manner to the graduation of a roman lever.

The levers 15 are ended on the side of the arms 9 and 11 and in the central space determined by the latter by two blocks 24.

The displacement of the cursors 16 along the lever 15 may obviously be effected by hand but it is preferable with an apparatus of this kind that the simultaneous displacement of the two cursors shall be automatically effected.

In the construction illustrated in the drawing the said automatic operation of the cursors is electrically effected by means of the following arrangement:

A small electric motor 17 integral with the member 8 is fixed in the space between the arms 9 and 11, the shaft 18 of the motor extending to each side of the motor carrying two friction rollers 19 at its ends.

The cursors 16 engaged on levers 15 are mounted upon two screw-threaded shafts 20 relatively to which they form nuts.

The said screw threaded shafts have a fixed position and are suitably trunnioned in the end part of the lever 15 by means of a pointed end 20''.

The two screw shafts 20 are provided at their ends 20' with a gearing 21 with which engages a pinion 22 integral with a shaft 23 trunnioned in a metallic body 24 provided on each lever 15.

The shaft 23 is integral with two nested concentric cup shaped drums 25 and 26 arranged to form space in which the roller 19 of the electric motor engages.

The working of the apparatus is as follows:—

The mode of action of the balance has been explained above with reference to Figs. 1, 2 and 3 and it will be understood that the double arrangement works in the same manner as the simple theoretical arrangement but realizing a symmetrical apparatus which is preferably used for practical purposes.

It is easily understood that when the load is exerted upon the bar 4' the two levers 15 have a tendency to become inclined in opposite directions, that is forming an angle between them and they may be brought in a horizontal position by a displacement of the cursors 16, the size of the said displacement serving as a measure for the load suspended to the rod 4'.

The automatic motion of the cursors 16 is obtained by the electric motor in the following conditions:—

When the apparatus is in the state of rest the levers 15 occupy an approximately horizontal position, and the friction rollers 19 are placed in the annular spaces between the concentric drums 25 and 26 in such a manner that they are not in contact with the external periphery of the drum 25 nor with the internal periphery of the drum 26. Under these conditions the electric motor being placed in permanent rotation at the beginning of the lifting and weighing operations the drums 25 and 26 are not driven from the rollers 19 and therefore they remain fixed together with the screw shafts 20 and the cursors 16.

When the load is exerted on the bar 4' the two levers 15 are inclined and then the rollers 19 come into contact with the periphery of one of the drums 25 and 26; the said drums are then automatically rotated together with the screw shafts 20 and the cursors 16 are displaced along the levers, the arrangement being of course such that the driving shall be effected in the direction which is necessary for the displacement of the cursors in order to produce the balancing.

When the balancing is obtained and the levers are brought into horizontal position the rollers 19 cease to be in contact with the drums 25 and 26 and in spite of the fact that the motor continues to rotate the said drums do not rotate any more and the cursors are stopped upon the levers at the point which has placed the latter in a horizontal position and which measures the load suspended to the load 4'.

The invention is not limited to the constructive arrangements illustrated which have been given by way of example only.

It is to be understood that weighing apparatus according to the above principle may be constructed with various modifications.

It will be also pointed out that this arrangement is not exclusively intended for measuring weights. It may also be used for measuring efforts and serve for the establishment of dynamometers and brakes such as those which are used for testing motors.

What I claim is:—

1. An apparatus of the type adapted to be attached to a lifting device for measuring the value of weight or an effort, comprising a shaft having a pair of integral portions, whose axes are eccentrically arranged with respect to each other, a collar mounted on one of said shaft portions having an arm rigidly attached thereto and provided with means for suspending said apparatus from a lifting device, a second collar mounted on the other of said shaft portions having an arm rigidly attached thereto and provided with means for suspending a weight therefrom, a balance lever secured to said shaft, said arms, lever and the eccentricity of said shaft portions being constructed and arranged to cause said lever to normally assume a horizontal position when no load is placed upon the apparatus and to cause said lever to be rotated in an upward direction from said horizontal position proportionately to the load placed upon said apparatus, a cursor slidably mounted on said lever and means to cause said cursor to be automatically moved along said lever to return.

2. An apparatus as claimed in claim 1 consisting of two symmetrical arrangements with two levers and two cursors, and two double eccentric axes, a pair of linked forks by means of which the arrangement is suspended to a fixed point and another pair of forks mounted on said axes and to which the body to be weighed is attached.

3. An apparatus as claimed in claim 2 having a device for an automatic electric operation of the cursors, as set forth.

In testimony whereof I have signed my name to this specification.

LOUIS-DOMINIQUE-JOSEPH-ARMAND DUNOYER.